United States Patent
Tanaka et al.

(10) Patent No.: US 8,893,865 B2
(45) Date of Patent: Nov. 25, 2014

(54) IMPACT ABSORBING STRUCTURE, METHOD FOR PRODUCING IMPACT ABSORBING STRUCTURE, AND MOVABLE BODY

(75) Inventors: Atsumi Tanaka, Tokyo (JP); Hironori Maruyama, Tokyo (JP); Naoki Higuchi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 213 days.

(21) Appl. No.: 13/498,388

(22) PCT Filed: Jan. 31, 2011

(86) PCT No.: PCT/JP2011/051890
§ 371 (c)(1),
(2), (4) Date: Mar. 27, 2012

(87) PCT Pub. No.: WO2011/099396
PCT Pub. Date: Aug. 18, 2011

(65) Prior Publication Data
US 2012/0187717 A1    Jul. 26, 2012

(30) Foreign Application Priority Data
Feb. 12, 2010  (JP) ................. 2010-029554

(51) Int. Cl.
*F16F 7/12* (2006.01)
*B64C 1/06* (2006.01)
*B64C 27/04* (2006.01)
(52) U.S. Cl.
CPC ............... *B64C 1/062* (2013.01); *B64C 27/04* (2013.01); *F16F 7/12* (2013.01)
USPC ......................................... 188/371; 244/119

(58) Field of Classification Search
USPC ............... 188/371, 377; 244/17.11, 121, 119, 244/117 R, 129.1
See application file for complete search history.

(56) References Cited

U.S. PATENT DOCUMENTS 4,029,350 A * 6/1977 Goupy et al. ............. 293/110
4,227,593 A * 10/1980 Bricmont et al. .......... 188/377
(Continued)

FOREIGN PATENT DOCUMENTS

| EP | 1 818 561 | 8/2007 |
| JP | 2000-356245 | 12/2000 |

(Continued)

OTHER PUBLICATIONS
International Search Report issued Feb. 22, 2011 in International (PCT) Application No. PCT/JP2011/051890.
(Continued)

*Primary Examiner* — Anna Momper
(74) *Attorney, Agent, or Firm* — Wenderoth, Lind & Ponack, LLP.

(57) ABSTRACT

The impact absorbing structure of the present invention is an impact absorbing structure for absorbing an impact in a case where the impact absorbing structure is subjected to the impact in a predetermined direction. The impact absorbing structure comprises a plurality of impact absorbing members, each of which is a tubular-shaped body whose longitudinal central axis is arranged along the impact direction and capable of absorbing the impact by being compressively collapsed when receiving the impact from the impact direction. At least one of the plurality of impact absorbing members being placed in such a way that a front end of the impact absorbing members is placed at a different position of ends of the other impact absorbing members in the impact direction, and the front end is an end closer to the direction which is forward in the impact direction.

17 Claims, 16 Drawing Sheets

(56) References Cited

U.S. PATENT DOCUMENTS

| | | |
|---|---|---|
| 5,542,626 A | 8/1996 | Beuck et al. |
| 2005/0001093 A1 | 1/2005 | Hayashi |
| 2007/0114331 A1 | 5/2007 | Poggi |

FOREIGN PATENT DOCUMENTS

| | | |
|---|---|---|
| JP | 3141570 | 3/2001 |
| JP | 2001-354197 | 12/2001 |
| JP | 3888630 | 3/2007 |
| JP | 2007-112432 | 5/2007 |
| JP | 2007-161128 | 6/2007 |
| JP | 4247038 | 4/2009 |
| JP | 2010-247789 | 11/2010 |

OTHER PUBLICATIONS

Written Opinion of the International Searching Authority issued Feb. 22, 2011 in International (PCT) Application No. PCT/JP2011/051890 with English translation.

European Search Report (in English), issued Jul. 7, 2014 in EP Application No. 11742141.2.

* cited by examiner (a)      (b)      (c)

IMPACT ABSORBING STRUCTURE, METHOD FOR PRODUCING IMPACT ABSORBING STRUCTURE, AND MOVABLE BODY

TECHNICAL FIELD

The present invention relates to an impact absorbing structure used for absorbing an impact in a structural body likely to have an impact such as a movable body, for example, an aircraft or an automobile, a method for producing the impact absorbing structure, and a movable body equipped with the impact absorbing structure.

Priority is claimed on Japanese Patent Application No. 2010-29554 filed on Feb. 12, 2010, the content of which is incorporated herein by reference.

BACKGROUND ART

A structural body which is likely to have an impact is provided with an impact-absorbing structure so as not to transfer an impact to an object to be protected, if the structure should be impacted. Structures for absorbing an impact in the manner that has been described above include movable bodies such as aircraft and automobiles. The aircraft include those having rotating blades such as a helicopter and an airplane. For example, a helicopter is provided with an underfloor structure with an impact absorbing structure for securing the safety of crews on forced landings. In this case, in order to secure the safety of crews in a helicopter, it is desirable to suppress a maximum value of acceleration on a floor surface and also decrease an initial gradient of acceleration on a floor surface immediately after an impact so as to fall within an acceleration profile guaranteed by impact resistant seats on which the crews are seated as shown in FIG. 17. In order to realize the desired acceleration profile, there have been proposed various structures in which impact absorbing members constituting an impact absorbing structure will collapse in a stepwise manner.

To be more specific, there has been proposed an impact absorbing member constituted with a tubular-shaped body which is formed with a fiber-reinforced resin and undergoes a stepwise change in thickness along a central axis thereof (for example, refer to Japanese Patent No. 3141570). In the above-described impact absorbing member, upon impact, collapse occurs in a stepwise manner from a site lower in thickness. Further, as another example, there has been proposed an impact absorbing member which is composed of a resin and a fiber layered body in which needling and stitching are provided in a stepwise manner (for example, refer to Japanese Patent No. 4247038). Upon impact, the above-described impact absorbing member that will collapse in a stepwise manner at a site where the needling and the stitching are provided and that is able to absorb an impact.

However, in the impact absorbing member disclosed in Japanese Patent No. 3141570, at individual sections different in thickness along the central axis, fracture characteristics are different depending on the thickness. Thereby, it is necessary to carry out a test for confirming the fracture characteristics at each of the sections. Further, where a load level, that is, the ratio of load at the start of collapse by an impact to load at completion of the collapse varies widely, there is a case that it is difficult to change the thickness in a stepwise manner to an extent that corresponds to a maximum load in any given length dimension. These problems are also found in the structure disclosed in Japanese Patent No. 4247038 where the needling and stitching are provided. In this case, a confirmation test is needed at every site where the needling and the stitching are provided. There is also a case where it is difficult to provide the needling and the stitching in a stepwise manner to such an extent that corresponds to a maximum load.

SUMMARY OF THE INVENTION

An object of the present invention is to provide an impact absorbing structure which can be easily installed by minimizing the time and labor of a confirmation test and keeping impact resistance characteristics required in a structural body to which the impact absorbing structure is installed, a method for producing the impact absorbing structure, and a movable body equipped with the impact absorbing structure.

The impact absorbing structure of the present invention is an impact absorbing structure for absorbing an impact in a case where the impact absorbing structure receives the impact in a predetermined direction. In addition, the impact absorbing structure is provided with a plurality of impact absorbing members, each of which is a tubular-shaped body whose longitudinal central axis is arranged along the impact direction and capable of absorbing the impact by being compressively collapsed when receiving the impact from the impact direction. At least one of the plurality of impact absorbing members is placed in such a way that a front end of the impact absorbing members is placed at a different position of ends of the other impact absorbing members in the impact direction, and the front end is an end closer to the direction which is forward in the impact direction.

According to this constitution, the plurality of impact absorbing members, each of which is a tubular-shaped body, are compressively collapsed when receiving the impact from the impact direction. In this case, of the plurality of impact absorbing members, at least one of the impact absorbing members is placed in such a way that a front end of the impact absorbing members is placed at a different position of ends of the other impact absorbing members in the impact direction, and the front end is an end closer to the direction which is forward in the impact direction. Thereby the collapse of the impact absorbing members will start at a different timing. Therefore, for example, where the position of the front end of the one impact absorbing member is further forward in the impact direction than the positions of the front ends of the other impact absorbing members, the one impact absorbing member is first compressively collapsed and then the other impact absorbing members are also compressively collapsed together with the one impact absorbing member. Thereby, changes in load in association with collapse, that is, impact resistance characteristics are allowed to proceed in a stepwise manner by the structural body as a whole. Further, since the plurality of impact absorbing members are made different only in positions of the front ends, the impact resistance characteristics of the structural body as a whole are allowed to change by the number of steps corresponding to the number of the installed impact absorbing members. Therefore, even when the load level varies widely, the impact resistance characteristics can be changed at a small extent of the load. Still further, since the plurality of impact absorbing members will collapse as a whole at a maximum load, it is possible to obtain necessary impact resistance characteristics even if the maximum load is great. In addition, since the plurality of impact absorbing members are made different only in positions of the front ends, it is possible to obtain the impact resistance characteristics which undergo a stepwise change, even if each of the impact absorbing members has the same cross sectional shape. Thus, it is not necessary to carry out tests for confirming the impact resistance characteristics of the impact absorbing members by the number of times corresponding to the number of collapse steps. In addition, each of the impact absorbing members is formed so as to have the same cross sectional shape, thus making it possible to grasp the impact resistance characteristics as a whole by conducting the confirmation test only once.

Further, the above-described impact absorbing structure may be provided with the plurality of impact absorbing members which are different in length, and these impact absorbing members which have different length in a longitudinal direction of the impact absorbing members; and base ends of the impact absorbing members are placed at a same position in the impact direction, the base ends being ends farther to the direction the impact is received from.

According to this constitution, since the impact absorbing members different in length in a longitudinal direction of the impact absorbing members are provided in a plural number, only by placing base ends of the plurality of impact absorbing members at the same position in the impact direction, the plurality of impact absorbing members can be installed so as to be different in position of each front end.

Further, the above-described impact absorbing structure may be provided with a core member placed between the impact absorbing members, and a pair of face plates which hold the core member and the impact absorbing members between the pair of face plates.

According to this constitution, during normal operation, the core member and the pair of face plates are used to retain the impact absorbing members, while supporting loads occurring. Upon impact, the impact can be absorbed effectively by using the plurality of impact absorbing members.

Further, the above-described impact absorbing structure may be provided with a filling member which is placed on the front end side of the impact absorbing member and between the pair of face plates.

According to this constitution, the filling member is placed on the front end side of the impact absorbing member and between the pair of face plates. Thereby, when the core member and the face plates are collapsed upon impact, penetration of the thus collapsed core member and face plates into the space is regulated by the filling member. It is, therefore, possible to prevent inhibition of collapse of the impact absorbing members by the core member and the face plates which have been collapsed.

Still further, in the above-described impact absorbing structure, the filling member may be an extended portion of the core member.

According to this constitution, the filling member is an extended portion of the core member. Thus, while the core member is collapsed similarly as with a main body part between the impact absorbing members upon impact, penetration of the main body part and the pair of face plates into the front end of the impact absorbing member can be also regulated.

Still further, in the above-described impact absorbing structure, the impact absorbing member and the filling member are formed as one piece.

According to this constitution, since the impact absorbing member and the filling member are formed as one piece, they can be handled as an integral part on assembly and assembled more easily.

Still further, the above-described impact absorbing structure may be provided with a film that closes an opening at the tip of the impact absorbing member.

According to this constitution, the opening at the tip of the impact absorbing member is closed by the film. Thereby, it is possible to prevent inhibition of collapse of the impact absorbing member due to penetration of the core member and the pair of face plates collapsed upon impact into the impact absorbing member.

In addition, the above-described impact absorbing structure may be provided a collapse assisting device that assists collapsing of the core member, and the collapse assisting device being placed on the core member and on the side forward in the impact direction. The core member is positioned between the impact absorbing members.

According to this constitution, the collapse of the core member is facilitated by the collapse assisting device upon impact. Thereby, it is possible to reliably prevent inhibition of collapse of the core member which is in progress.

Further, the movable body of the present invention is provided with the above-described impact absorbing structure, an outer structural member which is installed on the impact absorbing structure at the side forward in the impact direction, wherein the outer structural member is connected to the impact absorbing structure, and an inner structural member which is installed on the impact absorbing structure at the side rearward in the impact direction, wherein the inner structural member is connected to the impact absorbing structure.

According to this constitution, even if an impact is given to the movable body, it is possible to effectively absorb the impact by the impact absorbing structure which is placed between the outer structural member and the inner structural member to have the impact resistance characteristics which will change in a stepwise manner.

The present invention is also a method for producing an impact absorbing structure in a case where the impact absorbing structure receives the impact in a predetermined direction. The method comprises the step of placing impact absorbing members, in which a plurality of impact absorbing members, each of which is a tubular-shaped body whose longitudinal central axis is arranged along with the impact direction and capable of absorbing the impact by being compressively collapsed receiving the impact in the impact direction, are placed in such a manner that at least one of the plurality of impact absorbing members is placed in such a way that the front end of the impact absorbing member is placed at a different position of ends of the other impact absorbing members in the impact direction, wherein the front end is an end closer to the direction forward in the impact direction. In addition, the method comprises the step of connecting the impact absorbing members, in which the impact absorbing members are connected to each other.

According to this method, in the placing step of the impact absorbing members, the plurality of impact absorbing members, each of which is a tubular-shaped body, are placed in such a manner that at least one of the impact absorbing members is made different in position of the front end which is forward in the impact direction from the other impact absorbing members. In addition, in the connecting step of the impact absorbing members, these impact absorbing members are connected, only by which the impact absorbing structure can be produced. Then, upon impact in the impact direction, the plurality of impact absorbing members, each of which is a tubular-shaped body, are compressively collapsed to absorb the impact. In this case, the plurality of impact absorbing members are placed in such a manner that at least one of the impact absorbing members is made different in position of the front end which is forward in the impact direction from the other impact absorbing members. Thereby, collapse will start at a different timing. Thus, for example, where the front end of one of the impact absorbing members is positioned further forward in the impact direction than the front ends of the other impact absorbing members, the one impact absorbing member is first compressively collapsed and, then, the other impact absorbing members are also compressively collapsed together with the one impact absorbing member. Changes in load in association with collapse, that is, impact resistance characteristics are allowed to proceed in a stepwise manner by the structural body as a whole. Further, since the plurality of impact absorbing members are made different only in position of the front end, the impact resistance characteristics of the structural body as a whole can be changed only by the number of steps corresponding to the number of the installed impact absorbing members. Therefore, even when the load level varies widely, the impact resistance characteristics can be changed at a small extent of the load. Still further, since the plurality of impact absorbing members will collapse as a whole at a maximum load, it is possible to obtain necessary impact resistance characteristics even if the maximum load is great. In addition, since the plurality of impact absorbing members are made different only in positions of the front ends, it is possible to obtain the impact resistance characteristics which undergo a stepwise change even if each of the impact absorbing members has the same cross sectional shape. Thus, it is not necessary to carry out tests for confirming the impact resistance characteristics of the impact absorbing members by the number of times corresponding to the number of collapse steps. In addition, each of the impact absorbing members is formed so as to have the same cross sectional shape, thus making it possible to grasp the impact resistance characteristics as a whole by conducting the confirmation test only once.

Further, in the method for producing the above-described impact absorbing structure, a pair of face plates and impact absorbing members are fixed by placing the pair of the face plates so as to hold the impact absorbing members between the face plates in the step of connecting the impact absorbing members.

According to this method, in the connecting step of the impact absorbing members, only by holding and fixing the impact absorbing members between the pair of the face plates, the impact absorbing members different in position of the front end with each other can be connected and formed as one piece.

Further, in the method for producing the above-described impact absorbing structure, core members which have a plurality of member inserting holes formed in parallel with each other, are installed so that the direction of the member inserting holes is aligned along with the impact direction, and the impact absorbing members are inserted into each of the member inserting holes in the step of placing the impact absorbing members.

According to this method, in the placing step of the impact absorbing members, only by inserting the impact absorbing members into the member inserting holes of the core member, the impact absorbing members can be easily placed, with a predetermined interval, in such a manner that each of the central axis of the impact absorbing members is placed along the impact direction.

Further, the method for producing the above-described impact absorbing structure may comprise the step of preparing, in which a jig, which has an insertion portion capable of inserting into the impact absorbing member from the front end of the impact absorbing member, and a lock portion capable of locking the front end of the impact absorbing member to be inserted into the insertion portion, is arranged at a position which is the front end of the impact absorbing member placed in the step of placing impact absorbing members. In addition, the insertion portion of the arranged jig is inserted into the impact absorbing member until the front end of the absorbing member is locked by the lock portion, thereby positioning the impact absorbing member and also securing a space at the leading end of the impact absorbing member in the step of placing impact absorbing members.

According to this method, in the placing step of the impact absorbing members, only by inserting each of the plurality of impact absorbing members into the insertion portion of the jig arranged in the preparation step until the front end thereof is locked by the lock portion, the impact absorbing member can be easily positioned so as to be at a predetermined position in a mutually arrayed direction and in an impact direction. Further, when the impact absorbing member is positioned at the predetermined position, the jig is arranged at the front end of each of the impact absorbing members, by which, when the pair of face plates are installed in the connecting step of the impact absorbing members, it is possible to reliably secure a space at the front end of the impact absorbing member.

The impact absorbing structure of the present invention can be easily installed by keeping the impact resistance characteristics required in a structural body to which the impact absorbing structure is installed and minimizing the time and labor necessary for conducting a confirmation test.

Further, according to the method for producing the impact absorbing member of the present invention, the impact absorbing structure can be easily installed by minimizing the time and labor necessary for conducting a confirmation test, and also obtained are the impact resistance characteristics necessary for a structural body to which the impact absorbing structure is installed.

Still further, according to the movable body of the present invention, the impact absorbing structure can be used to effectively absorb an impact.

DETAILED DESCRIPTION OF THE INVENTION

First Embodiment

Figure 1:
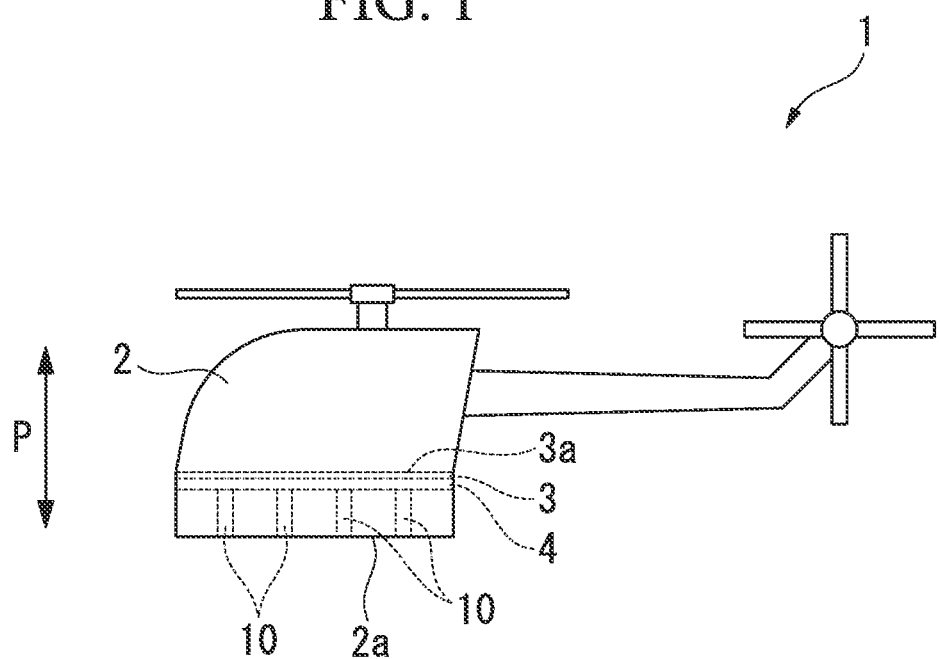
FIG. 1 is a schematic view which shows a helicopter according to a first embodiment of the present invention.
Figure 2:
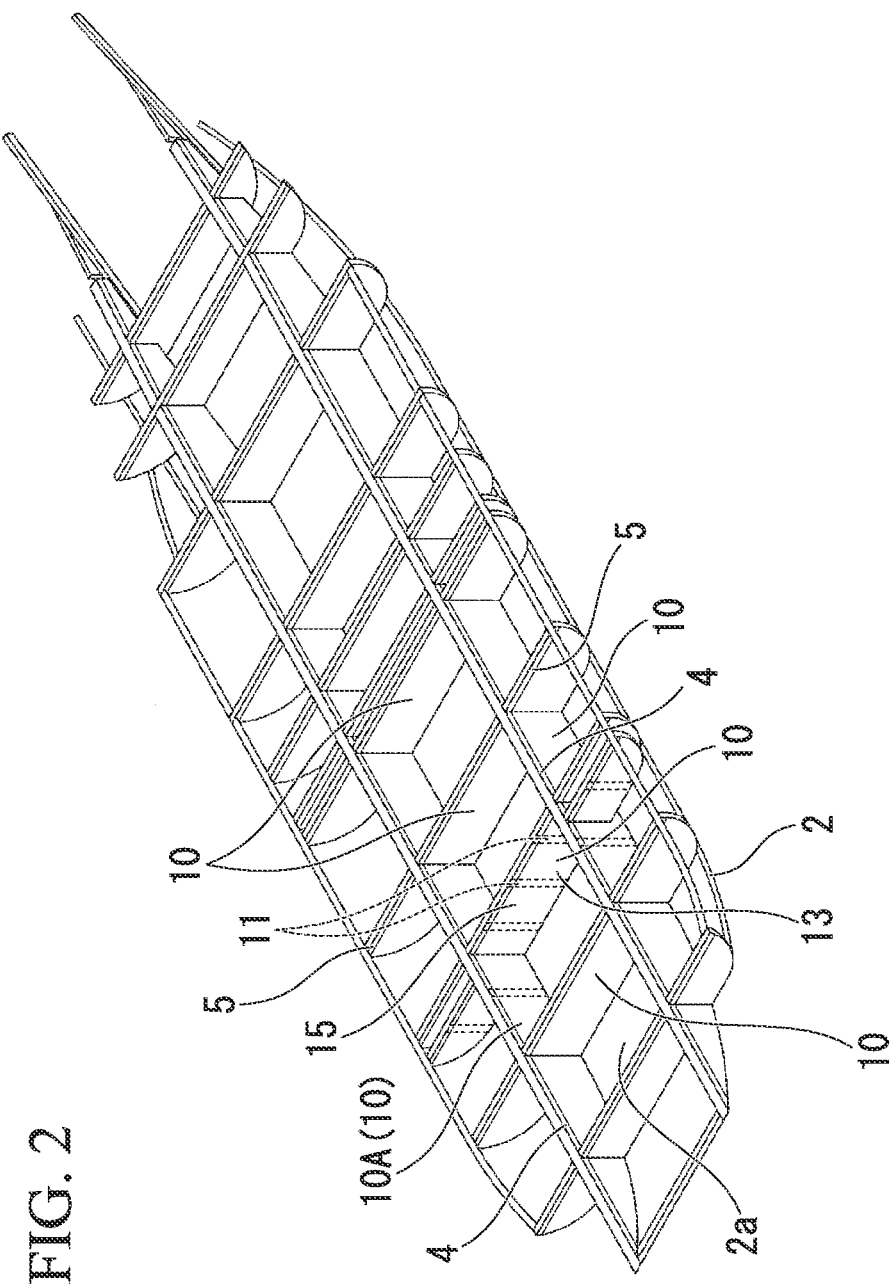
FIG. 2 is a partial perspective view which shows in detail an under-floor structure of a helicopter according to the first embodiment of the present invention.

A description will be given for the first embodiment of the present invention by referring to FIG. 1 to FIG. 11. FIG. 1 and FIG. 2 show a helicopter, that is, a movable body to which the impact absorbing structure of the present embodiment is assembled. As shown in FIG. 1, the helicopter 1 is provided with an outer-shell member 2 which is an outer shell and acts as an outer structural member, a floor member 3 which forms a floor surface 3a inside the outer-shell member 2, a beam 4 and a frame 5 which support the floor member 3 to act as inner structural members, and an impact absorbing structure 10 installed between a bottom 2a of the outer-shell member 2, the beam 4 and the frame 5. The impact absorbing structure 10 is to absorb an external impact from the bottom 2a of the outer-shell member 2 to the beam 4 and the frame 5 for supporting the floor member 3 on, for example, forced landing. That is, when a direction which moves from the bottom 2a of the outer-shell member 2 to the beam 4 and frame 5 is given as a predetermined impact direction P, the impact absorbing structure 10 is arranged so as to absorb an impact in the impact direction P. As shown in FIG. 2, the beam 4 is a member which is placed in a front-back direction of the outer-shell member 2. Further, the frame 5 is a member which is extended in a direction orthogonal to the beam 4 between the beams 4 and also from the beam 4 laterally. Then, there is consequently provided a lattice structure made up of the beams 4 and the frames 5. The impact absorbing structure 10 is also placed in a lattice shape between the bottom 2a of the outer-shell member 2 and the combination of the beam 4 with the frame 5.

Figure 3:
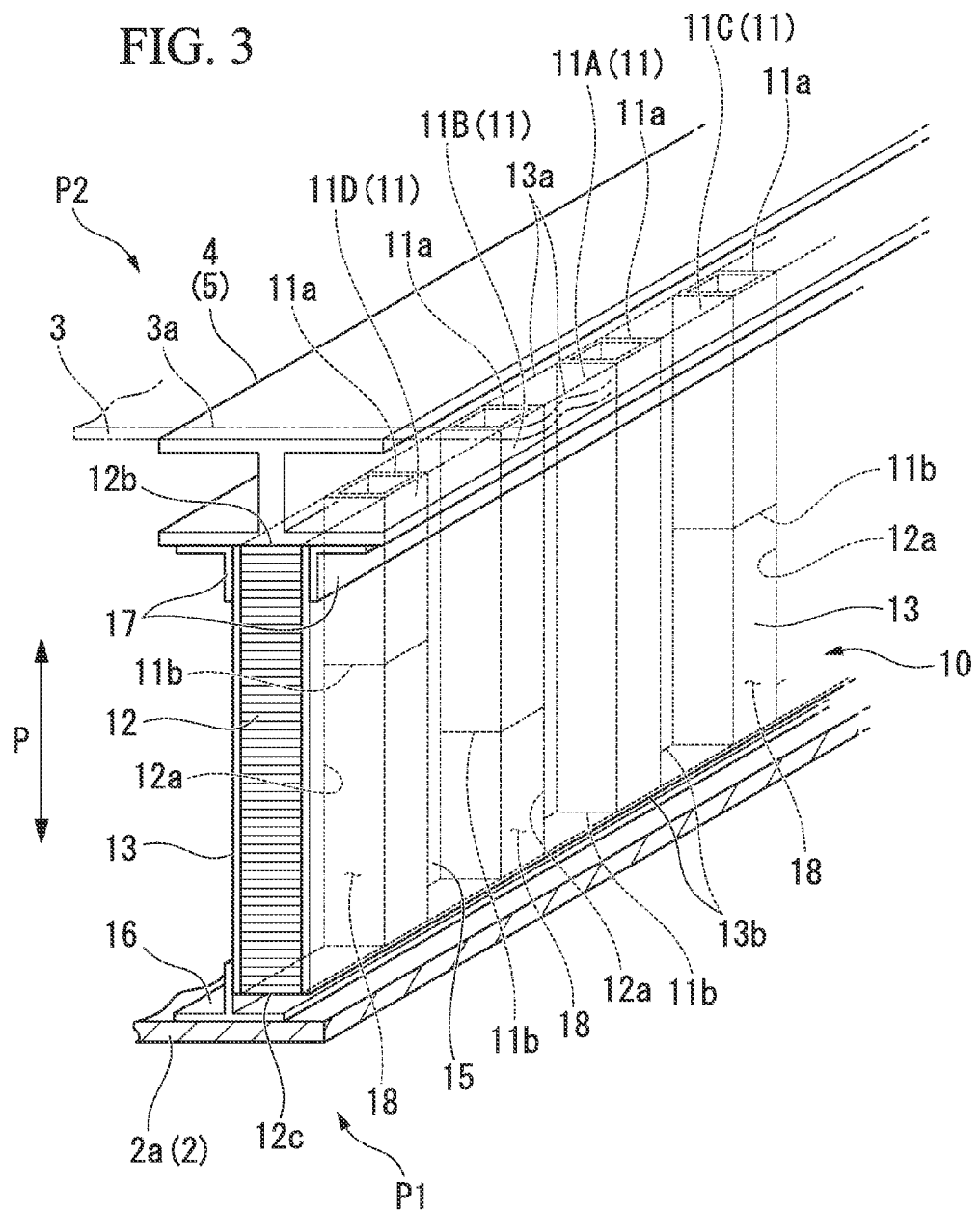
FIG. 3 is a partial perspective view which shows in detail an impact absorbing structure according to the first embodiment of the present invention.
Figure 4:
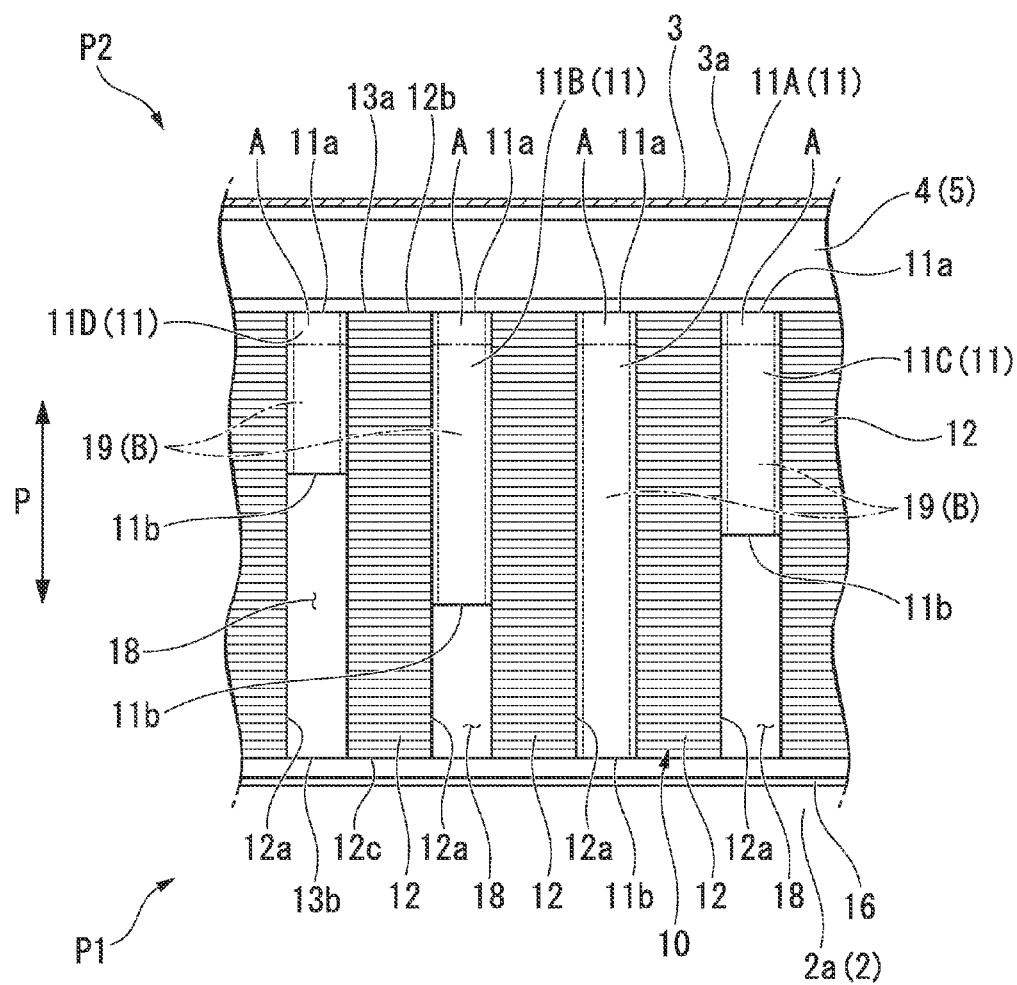
FIG. 4 is a front view which shows in detail an inner structure of the impact absorbing structure according to the first embodiment of the present invention.

As shown in FIG. 2 to FIG. 4, the impact absorbing structure 10 is available as a sandwich panel 15 which is composed of a plurality of impact absorbing members 11, each of which is a tubular-shaped body whose longitudinal central axis is arranged along the impact direction P and compressively collapsed when receiving an impact from the impact direction P, thereby capable of absorbing the impact, a core member 12 which is placed between the impact absorbing members 11, and a pair of face plates 13, 13 which hold the core member 12 and the impact absorbing members 11 between the pair of face plates 13, 13. Then, this sandwich panel 15 is connected to the bottom 2a of the outer-shell member 2 by a T-shaped rail 16 at a lower part which is on the side of P1 forward in the impact direction P and also connected to the corresponding beam 4 or frame 5 by an L-shaped rail 17 at an upper part which is on the side of P2 rearward in the impact direction P.

The pair of face plates 13, 13 which are formed in a thin plate shape mainly bear the strength of the sandwich panel 15 during normal operation and are also strong enough to be compressively collapsed without bearing an impact load upon impact. The face plate 13 can be formed with various types of materials selected from a composite material, a resin, a metal and others. For example, carbon fiber reinforced plastic (CFRP) is preferably selected. The core member 12 is held between the pair of face plates 13, 13 and fixed to each of the face plates 13 with an adhesive agent, in which member inserting holes 12a are formed along the impact direction P at a predetermined interval. The impact absorbing member 11 is placed into the member inserting hole 12a. As with the pair of face plates 13, 13, the core member 12 is strong enough to be compressively collapsed without bearing an impact load upon impact. As the adhesive agent, for example, an epoxy film adhesive agent is preferably selected. Further, it is preferable that the core member 12 is formed in a honeycomb structure, in view of securing the strength and reducing the weight thereof. The core member 12 can be made of various types of materials selected from a composite material, a resin, a metal and others. Preferably selected is, for example, an aromatic polyamide (aramid).

In the present embodiment, each of the plurality of impact absorbing members 11 is formed in the shape of a rectangular tube having the same rectangular cross sectional shape. It is noted that the impact absorbing member 11 is not necessarily in the shape of a rectangular tube and may be formed to be circular, pentagonal, and so on, in the cross section, only if formed at least in a tubular shape. Further, in the present embodiment, the impact absorbing member 11 is made of a composite material composed of a resin and a reinforced fiber. In addition, a carbon fiber reinforced plastic (CFRP) is preferably selected. Resins used in a composite material include thermosetting resins such as epoxy resin, unsaturated polyester resin, phenol resin, polyimide resin and polyurethane resin, or thermoplastic resins such as polyamide, polyethylene terephthalate, polyester and polycarbonate, depending on the intended use. Further, carbon fiber is preferably selected as a reinforced fiber used in the composite material. Other reinforced fibers that can be selected include, for example, glass fiber, aromatic polyamide fiber (aramid fiber), alumina fiber, carbon silicon fiber and boron fiber.

Then, in the present embodiment, the impact absorbing members 11 are constituted with four types different in length, that is, a first to a fourth impact absorbing members 11A to 11D in descending order of extended length, although the cross sectional shape thereof is the same as described above. And, they are arrayed as a set. In the thus constituted impact absorbing members 11, a base end 11a of each of them which is on the side of P2 rearward in the impact direction P is in contact with the corresponding beam 4 or frame 5 so as to be in alignment with one edge 13a of the face plate 13. Thereby, each of the impact absorbing members 11 different in length in a longitudinal direction of the impact absorbing members is placed in such a manner that a front end 11b of each of them is positioned differently in the impact direction P. That is, the front end 11b of the first impact absorbing member 11A is arranged so as to be in alignment with the other edge 13b which is opposite to the one edge 13a of the face plate 13. On the other hand, the front end 11b of each of the second to the fourth impact absorbing members 11B to 11D is arranged so as to deviate in position sequentially to an upper part which is on the side of P2 rearward in the impact direction P. Therefore, at the front end 11b of each of the second to the fourth impact absorbing members 11B to 11D excluding the first impact absorbing member 11A, there is formed a space 18 held between the pair of face plates 13, 13 and the core member 12 as a part of the member inserting hole 12a. Further, the impact absorbing members 11 are individually fixed to the pair of face plates 13, 13 by using an adhesive agent and accordingly formed in an integrated manner. In this case, as shown in FIG. 4, in the present embodiment, only a portion of the base end 11a is bonded and fixed as a bonded region A, while the other portion is covered with a mold releasing material 19 and referred to as a non-bonded region B. As the adhesive agent, for example, an epoxy film adhesive agent is preferably selected, which is also used in bonding the face plate 13 with the core member 12. Further, as the mold releasing material 19, a mold releasing film, for example, a FEP (tetrafluoroethylene hexafluoropropylene copolymer (4, 6 fluoro) film is preferably used. It is noted that the FEP film is available under the brand name of A5000 WHITE from Richmond Inc.

Next, a description will be given for the method for producing the impact absorbing structure 10 of the present embodiment. The method for producing the impact absorbing structure 10 of the present embodiment is provided with a preparation step for preparing various types of members, a placing step of the impact absorbing members for placing impact absorbing members 11 prepared in the preparation step, and a connecting step of the impact absorbing members for connecting the placed impact absorbing members 11. Hereinafter, each of the steps will be described in detail.

Figure 5:
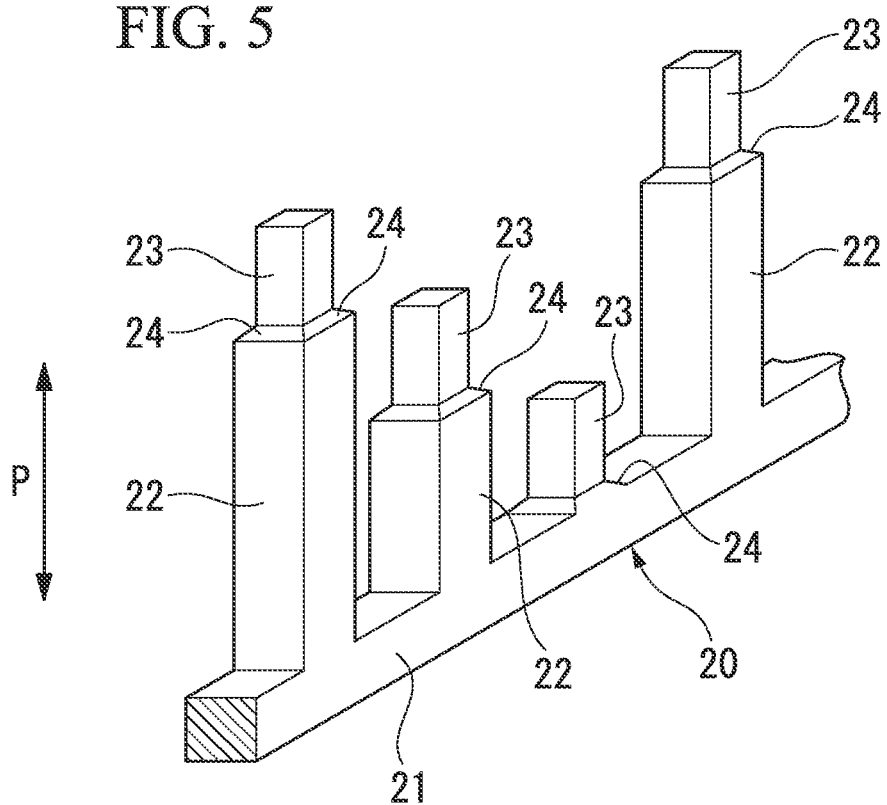
FIG. 5 is a perspective view which shows in detail a jig used in a method for producing the impact absorbing structure according to the first embodiment of the present invention.

First, in the preparation step, there are prepared the pair of face plates 13, 13, the core member 12 and the impact absorbing members 11 which are formed in predetermined dimensions. In the impact absorbing member 11, a site which acts as a non-bonded region B is covered by winding the mold releasing material 19. Further, the jig 20 shown in FIG. 5 is arranged at a predetermined position. As shown in FIG. 5, the jig 20 is provided with a base portion 21 extending at a predetermined position along a direction at which the impact absorbing members 11 are arrayed, a main body portion 22 projecting from the base portion 21 in a direction which is the impact direction P at a position at which each of the impact absorbing members 11 is arranged, and an insertion portion 23 projecting from the main body portion 22 or the base portion 21. The width dimension of the main body portion 22 is substantially equal to or slightly smaller than that of the member inserting hole 12a so as to be inserted into the member inserting hole 12a without any clearance.

Further, the width dimension of the insertion portion 23 is substantially equal to or slightly smaller than the inner width dimension of the impact absorbing member 11 so as to be inserted into the impact absorbing member 11 without any clearance. Therefore, there is formed a stepped portion between the main body portion 22 and the insertion portion 23 which acts as a lock portion 24 by which the front end 11b of the impact absorbing member 11 is locked as described later. The length of the main body portion 22 corresponds to the space 18 at the front end 11b of each of the first to fourth impact absorbing members 11A to 11D. That is, no main body portion 22 is provided at a position corresponding to the first impact absorbing member 11A. The insertion portion 23 directly projects from the base portion 21, by which the base portion 21 in itself constitutes the lock portion 24. At a position corresponding to each of the second to the fourth impact absorbing members 11B to 11D, each of the main body portions 22 projects in a gradually increasing length.

Figure 6:
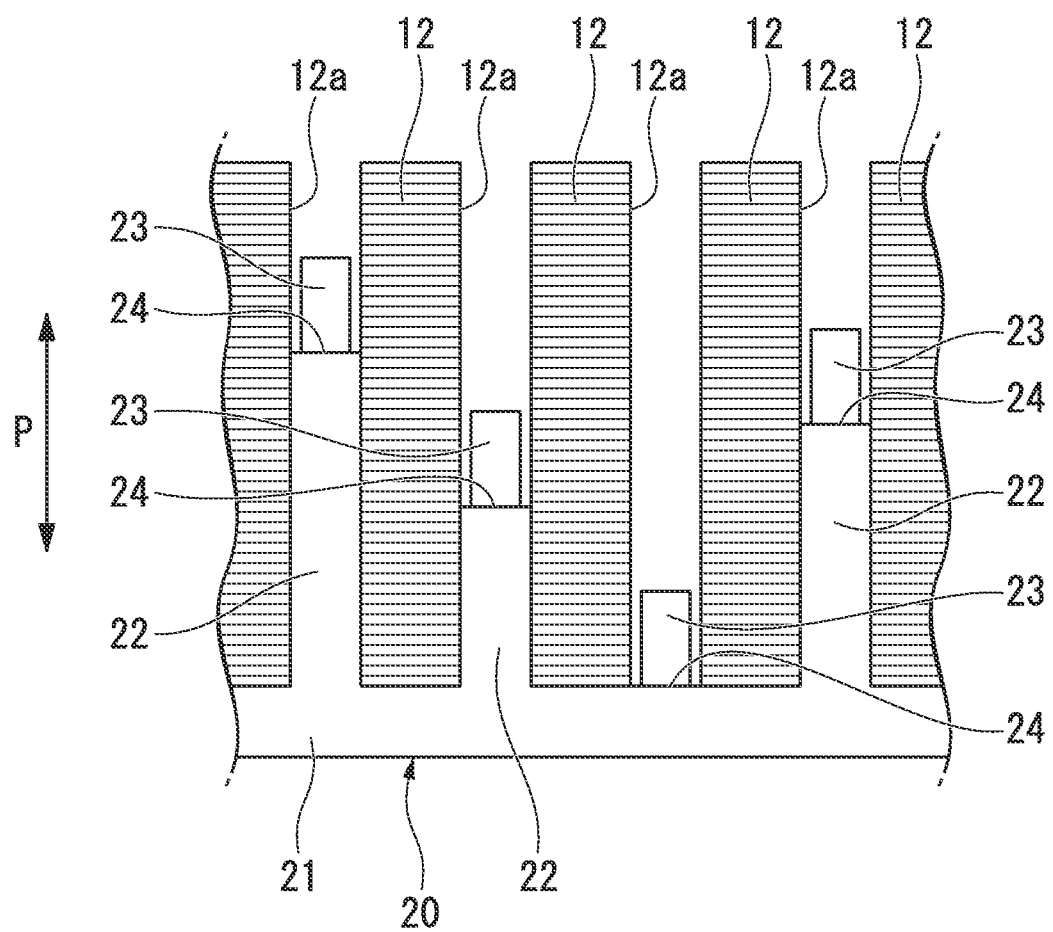
FIG. 6 is a view which explains a placing step of the impact absorbing members in the method for producing the impact absorbing structure according to the first embodiment of the present invention.
Figure 7:
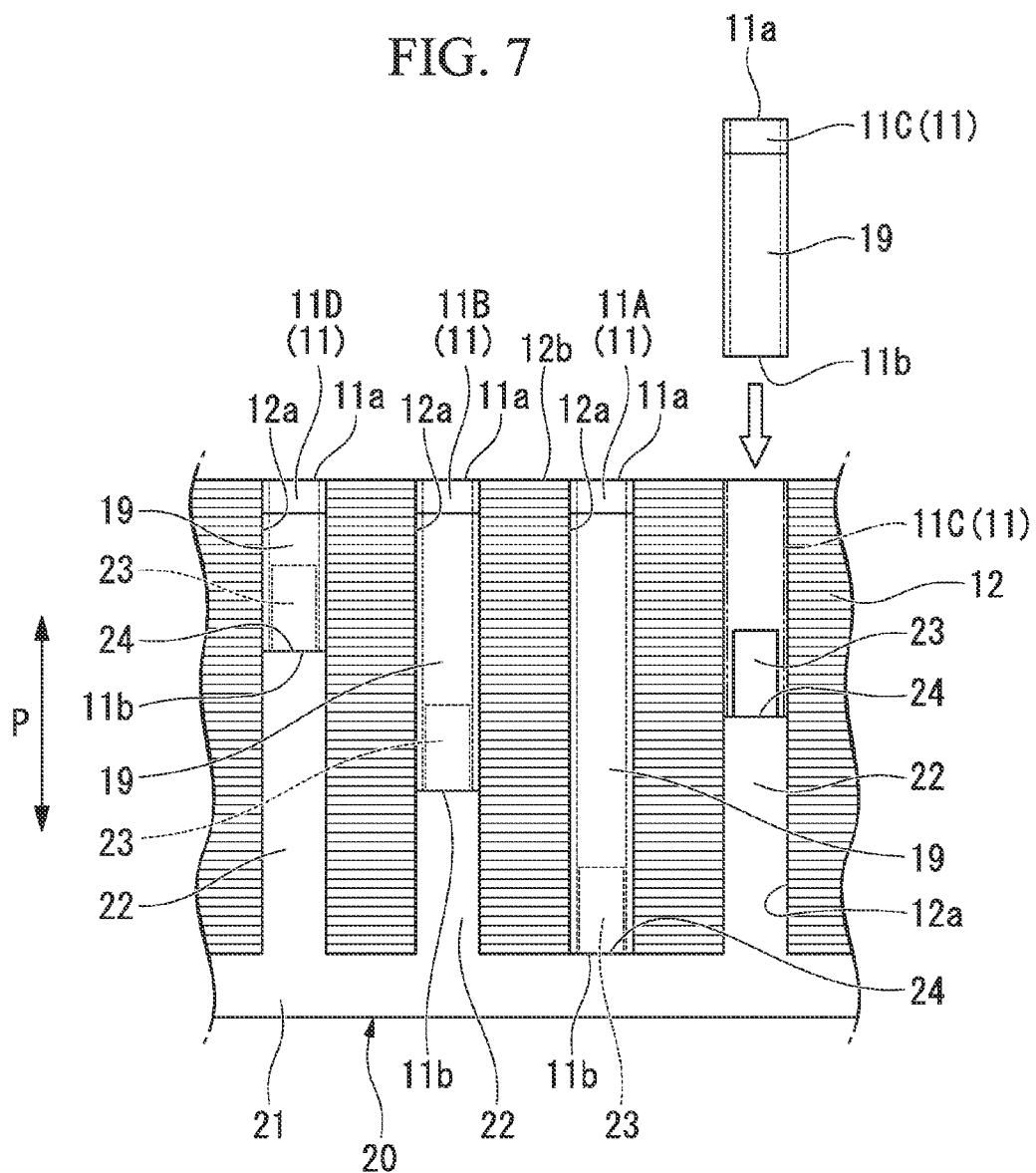
FIG. 7 is a view which explains the placing step of the impact absorbing members in the method for producing the impact absorbing structure according to the first embodiment of the present invention.

Then, in the placing step of the impact absorbing members, as shown in FIG. 6, first, the core member 12 is arranged in such a manner that the main body portion 22 is inserted into the member inserting hole 12a at the jig 20 installed at a predetermined position. Next, each of the impact absorbing members 11 is inserted into the member inserting hole 12a. Then, as shown in FIG. 7, when the impact absorbing member 11 is inserted, the insertion portion 23 of the jig 20 is inserted into the front end 11b of each of the impact absorbing members 11. Finally, the front end 11b is locked by the lock portion 24. In this case, as described above, the length of the main body portion 22 corresponds to the space 18 at the front end 11b of each of the first to the fourth impact absorbing members 11A to 11D. Thereby, each of the first to the fourth impact absorbing members 11A to 11D is positioned in such a manner that the base end 11a of each of them is in alignment with the one edge 12b of the core member 12 and also the front end 11b of each of them is positioned differently in an axial direction of the member inserting hole 12a.

Figure 8:
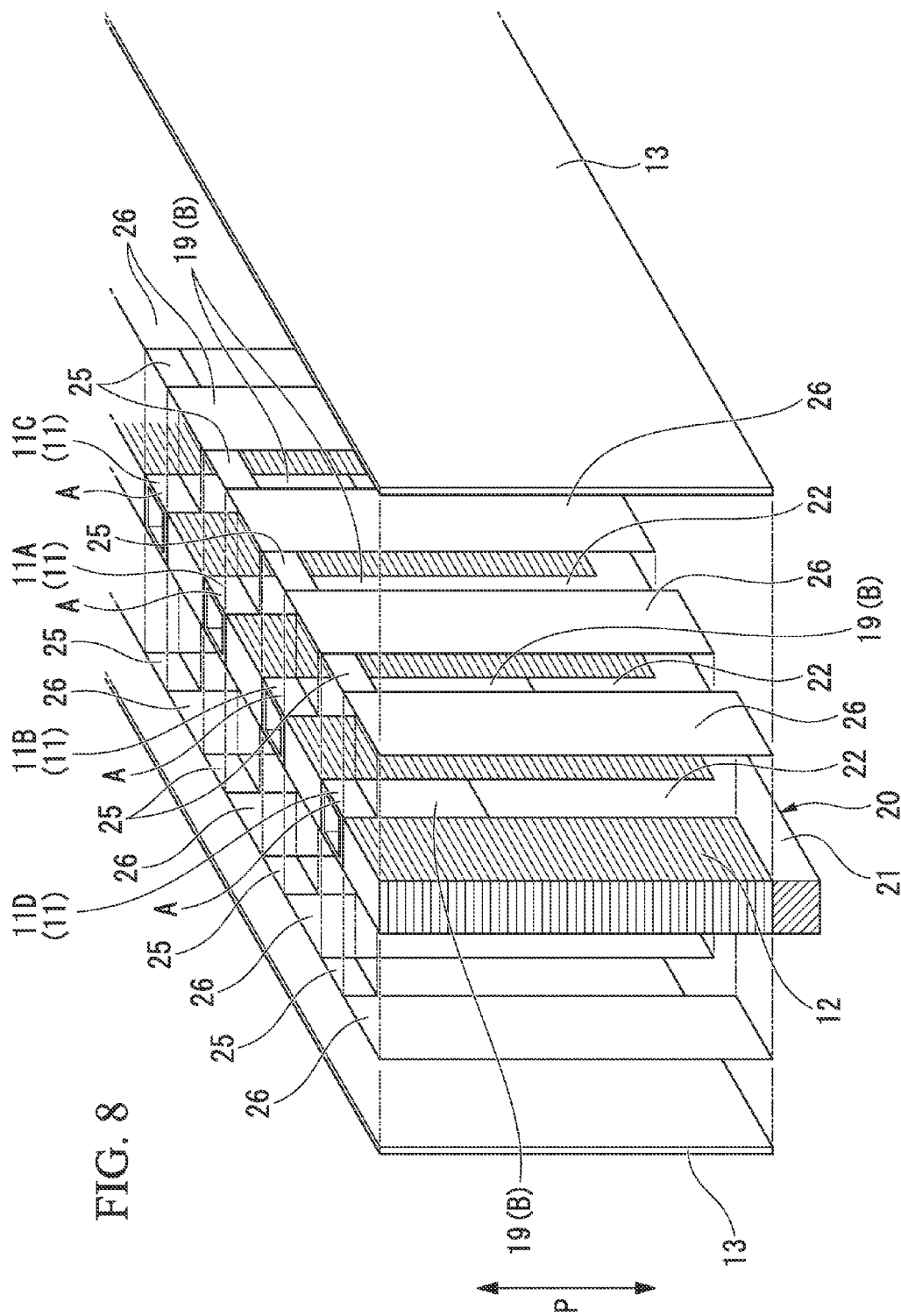
FIG. 8 is a view which explains a connecting step of the impact absorbing members in the method for producing the impact absorbing structure according to the first embodiment of the present invention.

Then, in the connecting step of the impact absorbing members, as shown in FIG. 8, first, adhesive films 25, 26 which act as an adhesive agent are affixed to an entire region to which the core member 12 is exposed and a bonded region A at the base end 11a of the impact absorbing member 11, that is, a region which is not covered with the mold releasing material 19. With this state kept, the adhesive films are affixed so as to hold the pair of face plates 13, 13 from both sides, by which the pair of face plates 13, 13, the core members 12 and the impact absorbing members 11 are bonded as one piece. In this case, since the impact absorbing members 11 are accurately positioned, the pair of face plates 13, 13, the core members 12, and the impact absorbing members 11 can be assembled accurately. Further, the space 18 at the front end 11b of the impact absorbing member 11 is filled with the main body portion 22 of the jig 20. It is, thereby, possible to secure the space 18 and prevent the adhesive agent from flowing into the front end 11b of the impact absorbing member 11 or prevent the space 18 from being narrowed due to the face plate 13 recessed by a pressure at a time of bonding with the adhesive agent.

Next, a description will be given for actions of the impact absorbing structure 10 of the present embodiment.

Where an impact occurs from outside in the impact direction P, that is, from the bottom 2a of the outer-shell member 2 shown in FIG. 1 to the beam 4 and the frame 5 which support the floor member 3, the plurality of impact absorbing members 11, each of which is a tubular-shaped body, are compressively collapsed to absorb the impact. In this case, the first to the fourth impact absorbing members 11A to 11D are placed so as to be different from each other in position at the front end 11b, by which the collapse will start at a different timing. That is, in FIG. 3 and FIG. 4, upon impact, the impact is first transferred to the front end 11b of the first impact absorbing member 11A, the pair of face plates 13, 13, and the other edges 12c, 13b of the core members 12. Since the pair of face plates 13, 13 and the core members 12 are hardly strong enough to bear loads against the impact, the collapse will proceed. Further, the first impact absorbing member 11A is given an impact from the front end 11b and compressively collapsed, thereby absorbing the impact. When the first impact absorbing member 11A proceeds with collapse by compression and the collapse by compression reaches the front end 11b of the second impact absorbing member 11B, the second impact absorbing member 11B is also given the impact and compressively collapsed. Thereby, the impact is absorbed by the first impact absorbing member 11A and the second impact absorbing member 11B. In the manner that has been described above, the third impact absorbing member 11C and the fourth impact absorbing member 11D are also sequentially compressively collapsed. Finally, the first to the fourth impact absorbing members 11A to 11D all proceed with collapse by compression.

Figure 9:
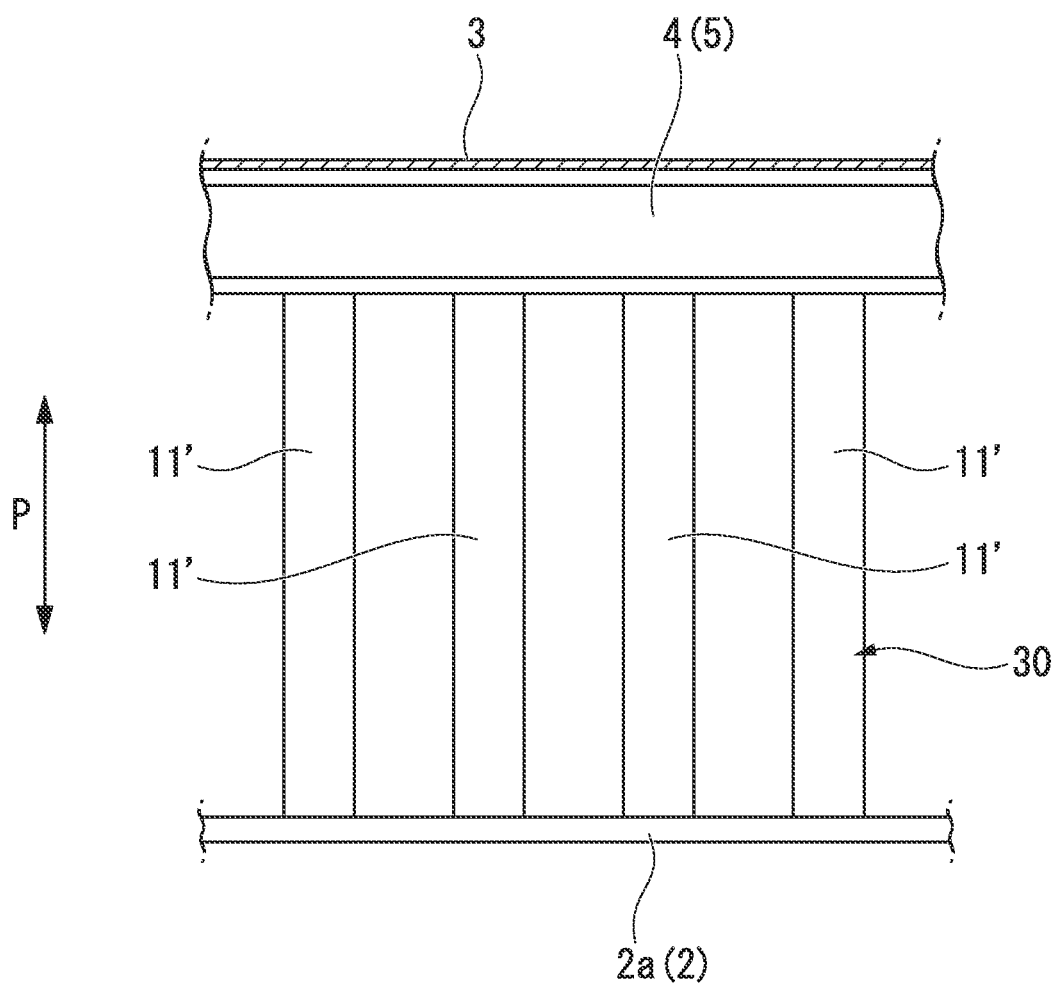
FIG. 9 is a front view which shows an impact absorbing structure according to a comparative example.
Figure 10:
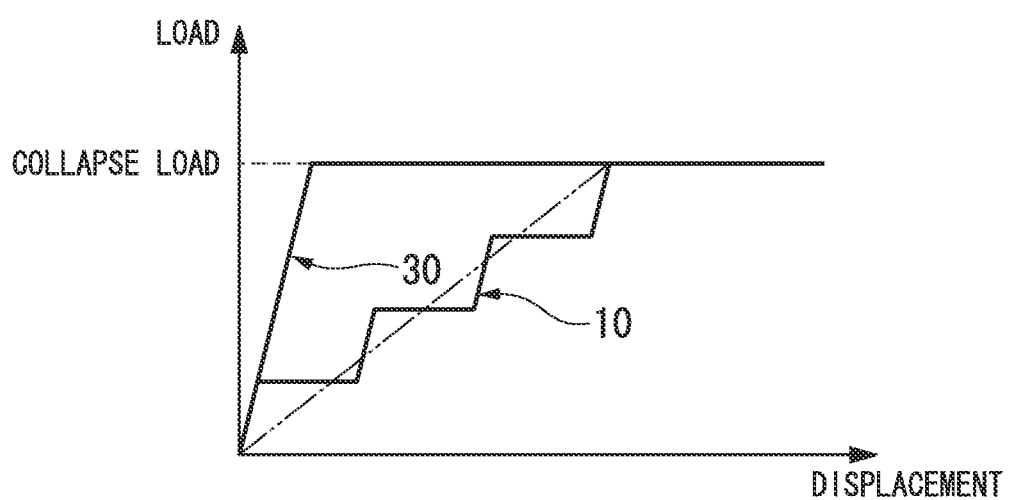
FIG. 10 is a graph which shows impact resistance characteristics of the impact absorbing structure according to the first embodiment of the present invention and those according to the comparative example.
Figure 17:
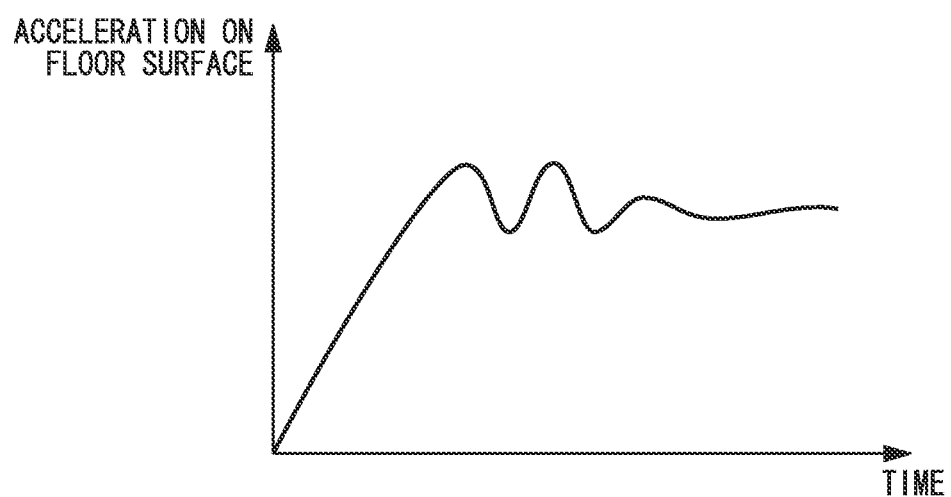
FIG. 17 is a graph which shows one example of an acceleration profile.

FIG. 10 is a graph which compares the impact resistance characteristics of an impact absorbing structure 30 of a comparative example as shown in FIG. 9 with those of the impact absorbing structure 10 of the present embodiment. To be more specific, the impact absorbing structures 10 and 30 respectively shown in FIG. 4 and FIG. 9 are made into models in which an impact is given in the impact direction P to determine displacement of the bottom 2a of the outer-shell member 2 and loads acting at this time, thereby expressing a relationship between the displacement and the loads in a graph. In this case, the impact absorbing structure 30 of the comparative example is provided with a plurality of impact absorbing members 11', each of which has the same cross sectional shape as that of the impact absorbing member 11 of the present embodiment. However, the plurality of impact absorbing members 11' are all equal in length, with all the front ends 11b being placed at the same position. Therefore, as shown in FIG. 10, upon impact, the impact absorbing structure 30 shows a linear change in load with respect to the displacement at an initial step of the impact, undergoing displacement and proceeding with collapse, with a substantially constant collapse load kept when the load reaches a collapse load of each of the impact absorbing members 11'. On the other hand, in the impact absorbing structure 10 of the present embodiment, first, the first impact absorbing member 11A is subjected to compressive deformation, by which the load is changed linearly with respect to displacement. Then, when the load reaches the collapse load of the first impact absorbing member 11A, the impact absorbing structure 10 undergoes displacement, with the collapse load kept substantially constant, up to the position of the front end 11b of the second impact absorbing member 11B. Then, when the load is displaced up to the position of the front end 11b of the second impact absorbing member 11B, the load is imparted to the second impact absorbing member 11B to result in compressive deformation of the second impact absorbing member 11B. Thereby, the load shows a linear change with respect to the displacement. Then, when the load reaches a sum of the collapse load of the first impact absorbing member 11A and the collapse load of the second impact absorbing member 11B, the second impact absorbing member 11B is also compressively collapsed. In addition, the load is displaced up to the position of the front end 11b of the third impact absorbing member 11C, with the sum of the collapse loads kept substantially constant. In the manner that has been described above, the position of the front end 11b of each of impact absorbing members 11 is made different in a stepwise manner, by which the impact resistance characteristics also make a stepwise change according to the number of steps and as a whole, the impact resistance characteristics are changed to those lower in initial gradient. Thus, in the impact absorbing structure 10 of the present embodiment, it is possible to easily obtain the impact resistance characteristics for realizing an acceleration profile (for example, that shown in FIG. 17) secured by the seats to be assembled into the helicopter 1.

Further, in the impact absorbing structure 10 of the present embodiment, the positions of the front end 11b of the plurality of impact absorbing members 11 are made different in the impact direction P, thereby realizing the impact resistance characteristics which will change in a stepwise manner. Therefore, even when the load level varies widely, the impact resistance characteristics can be changed at a small extent of the load. Still further, since the plurality of impact absorbing members 11 will collapse as a whole at a maximum load, it is possible to obtain necessary impact resistance characteristics even if the maximum load is great. In addition, since the positions of the front ends 11b of the plurality of impact absorbing members 11 are made different only in the impact direction P, it is possible to obtain the impact resistance characteristics which will change in a stepwise manner for each of the impact absorbing members with the same cross sectional shape. Then, the impact absorbing members 11 are all formed so as to have the same cross sectional shape as shown in the present embodiment, by which it is not necessary to carry out tests for confirming the impact resistance characteristics of the impact absorbing members 11 by the number of times corresponding to the number of collapse steps. The impact absorbing member with the same cross sectional shape is used to carry out a confirmation test once, thus making it possible to figure out the impact resistance characteristics as a whole.

Further, in the present embodiment, in order to make different in position of the front end 11b of each of the impact absorbing members 11, there are prepared impact absorbing members 11 which are different in length. Thus, each of the impact absorbing members 11 can be installed so as to be different in position of the front end 11b only by placing the base end 11a thereof at the same position in the impact direction P on the basis of one edge 13a of the face plate 13. Further, the impact absorbing structure 10 of the present embodiment is constituted with the impact absorbing members 11, the core members 12 and the pair of face plates 13, 13. Thereby, during normal operation, the core members 12 and the pair of face plates 13, 13 are used to support the load occurring and also retain the impact absorbing members 11. In addition, upon impact, it is possible to effectively absorb the impact by the plurality of impact absorbing members 11 in the manner that has been described above.

Further, in the method for producing the impact absorbing structure 10 of the present embodiment, in the placing step of the impact absorbing members, the plurality of impact absorbing members 11, each of which is a tubular-shaped body, are placed in such a manner that the front ends 11b thereof are made different in position with each other, and in the connecting step of the impact absorbing members, these impact absorbing members 11 are connected, only by which the impact absorbing structure 10 can be produced. In particular, in the placing step of the impact absorbing members, the impact absorbing member 11 can be placed in a predetermined direction only by being inserted into the member inserting hole 12a of the core member 12 and can also be positioned more accurately by using the jig 20. Still further, in the connecting step of the impact absorbing members, only the pair of face plates 13, 13 are used to hold the impact absorbing members 11 between these face plates, by which they are bonded with each other and fixed. Thus, the impact absorbing members 11, each of which is different in position of the front end 11b, can be easily connected and formed as one piece. Since the jig 20 is used in this case, it is possible to secure the space 18 at the front end 11b of each of the impact absorbing members 11 and also reliably prevent the adhesive agent from flowing into the space 18, as described above.

In the above-described embodiment, as the impact absorbing members 11, four types of impact absorbing members 11A to 11D different in length are prepared and arranged in such a manner that the position of the front end 11b of each of them is made different in four steps in the impact direction P, to which the present invention shall not be, however, limited. If the front end 11b of at least any one of the impact absorbing members 11 is different in position in the impact direction P from the front ends 11b of the other impact absorbing members 11, it is possible to change the impact resistance characteristics in a stepwise manner in one step or more. Alternatively, the front ends 11b of all the disposed impact absorbing members 11 may be made different in position in the impact direction P.

Figure 11:
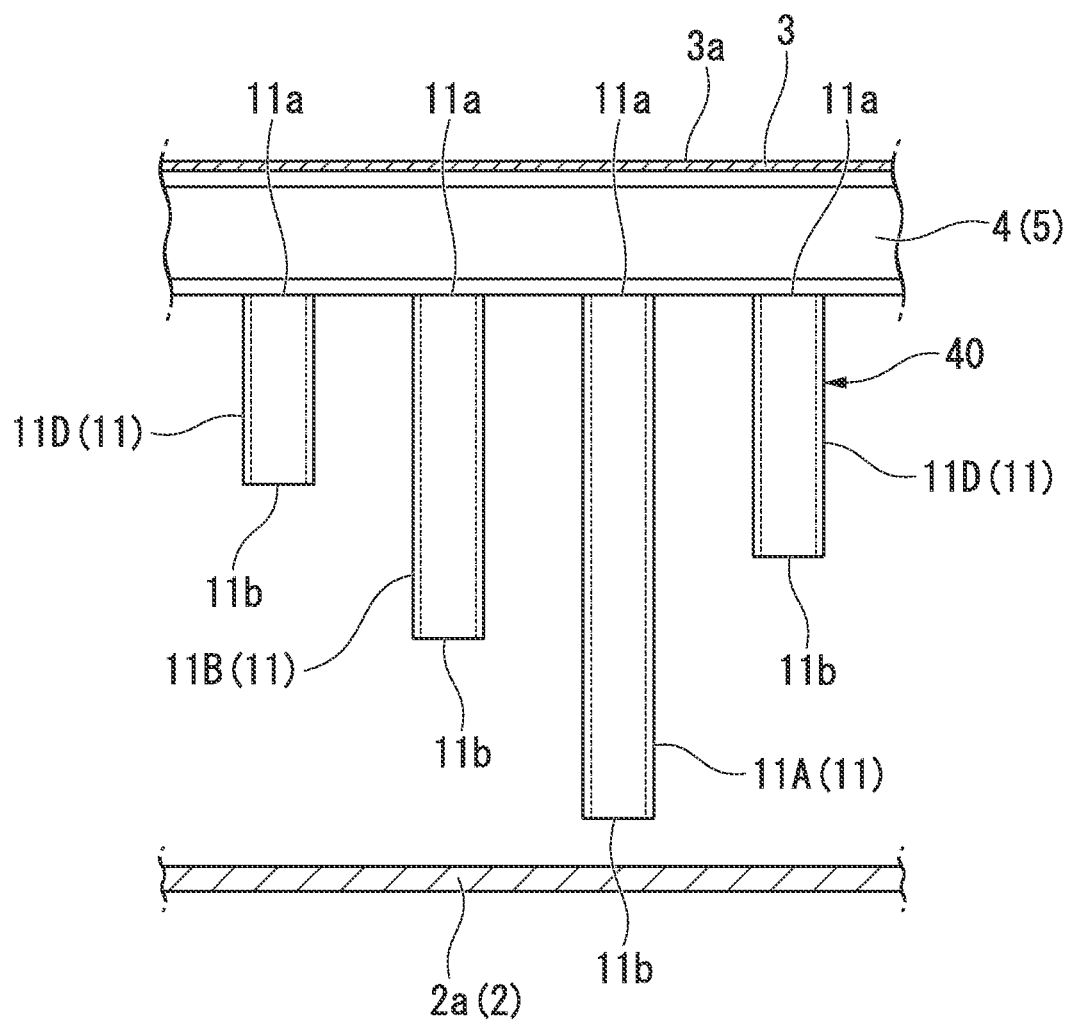
FIG. 11 is a front view which shows in detail an impact absorbing structure of a modified example according to the first embodiment of the present invention.

Further, in the present embodiment, the impact absorbing structure 10 is constituted with the impact absorbing members 11, the core members 12, and the pair of face plates 13, 13, to which the present invention shall not be, however, limited. FIG. 11 shows a modified example of the present embodiment. As shown in FIG. 11, in an impact absorbing structure 40 of the modified example, a first to a fourth impact absorbing members 11A to 11D different in length are only bonded and joined to a beam 4 and a frame 5 which support a base end 11a and a floor member 3. The impact absorbing structure 40 is not provided with a core member 12 or a pair of face plates 13, 13 or not connected to an outer-shell member 2 positioned on the side of P1 forward in the impact direction P. Even in the above-described constitution, upon impact, the outer-shell member 2 is collapsed and in contact with the front end 11b of the impact absorbing member to transmit the impact. Thereby, the impact absorbing members 11 held between the beam 4 or the frame 5 and the collapsed outer-shell member 2 are compressively collapsed and able to absorb the impact. In addition, the front ends 11b of the impact absorbing members 11 are different in position, thus making it possible to obtain the impact resistance characteristics in a stepwise manner.

Second Embodiment

Figure 12:
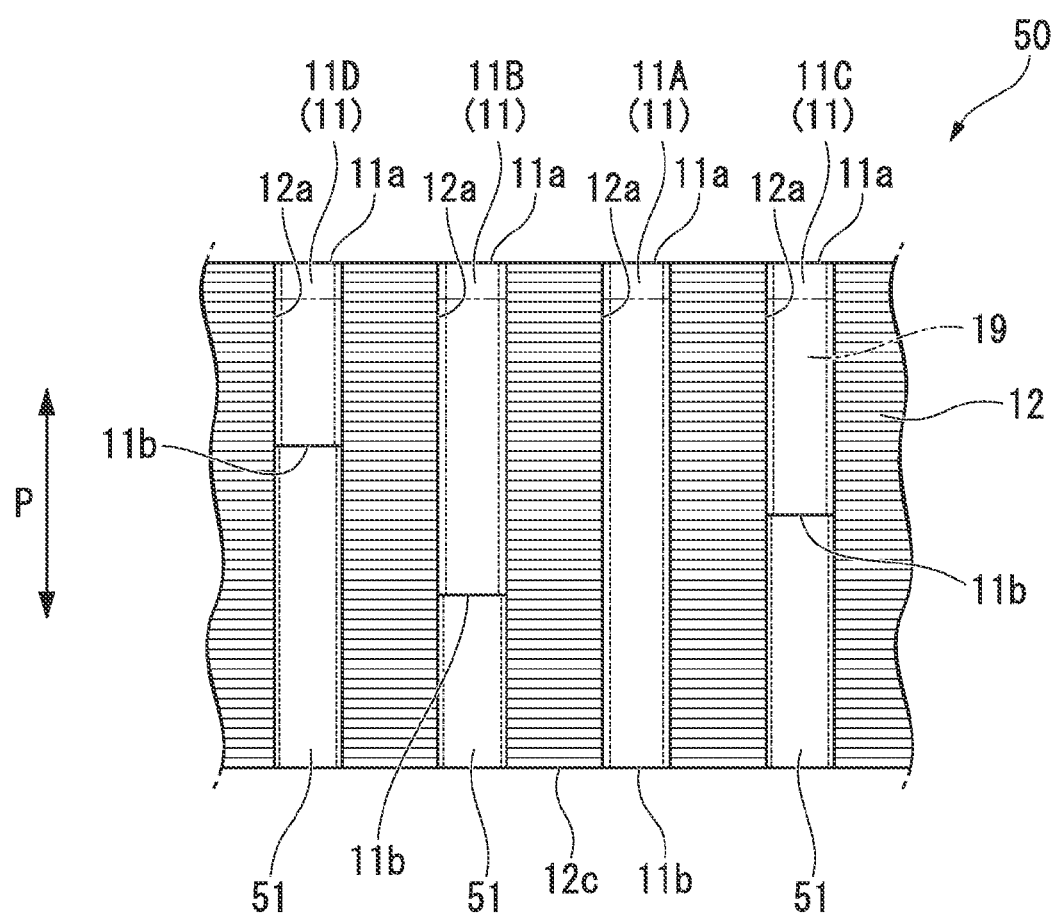
FIG. 12 is a front view which shows in detail an inner structure of an impact absorbing structure according to a second embodiment of the present invention.

Next, a description will be given for a second embodiment of the present invention. FIG. 12 shows the second embodiment of the present invention. In this embodiment, members common to those used in the previous embodiments will be given the same reference symbols, with an explanation thereof being omitted here.

As shown in FIG. 12, an impact absorbing structure 50 of this embodiment is provided with four types of impact absorbing members 11 (11A to 11D) different in length and having the same cross sectional shape, core members 12 installed between the impact absorbing structural members, and a pair of face plates (not illustrated) holding the core members 12 and the impact absorbing members 11 between the pair of face plates. The impact absorbing body 50 is also provided with a filling member 51 which is filled into a space at the front end 11b of each of the impact absorbing members 11. The filling member 51 is a rectangular tubular-shaped body in an outer shape corresponding to the cross sectional shape of the member inserting hole 12a of the core member 12. Then, since the filling member 51 is made long so as to correspond to the length of the space at the front end 11b of each of the impact absorbing members 11, there are filled areas from the front ends 11b of the impact absorbing members 11 to the pair of face plates 13, 13 and other edges 12c, 13b of the core members 12. That is, the filling member 51 is placed at the front end 11b of each of the second to the fourth impact absorbing members 11B to 11D at which the space is formed, and each of the corresponding filling members 51 is extended to a shorter length accordingly in the order of the second to the fourth impact absorbing members 11B to 11D.

The filling member 51 is specified for a material and a cross sectional dimension so as to collapse upon impact, as with the core member 12 and the pair of face plates 13, 13, thereby not inhibiting the collapse of the impact absorbing members 11 by compression. That is, the filling member 51 is lower in thickness than the impact absorbing members 11. Further, the filling member 51 may be made with a material selected from various materials such as a composite material, a resin and a metal as with the core member 12. For example, aromatic polyamide (aramid) is preferably selected. The method for producing the impact absorbing structure 50 of the present embodiment is also fundamentally similar to that for producing the first embodiment. That is, in the placing step of the impact absorbing members, the filling member 51 and the impact absorbing member 11 are inserted into a member inserting hole 12a of the previously arranged core member 12, and in the connecting step of the impact absorbing members, the pair of face plates 13, 13 are used to hold the core members 12, the filling members 51 and the impact absorbing members 11 between the pair of face plates and fix the core members 12, the filling members 51 and the impact absorbing members 11.

In the impact absorbing structure 50 of the present embodiment, working effects similar to those of the first embodiment are obtained, and also the filling member 51 is placed at the space 18 at the front end 11b of the impact absorbing member 11 between the pair of face plates 13, 13. Thereby, when the core member 12 and the face plate 13 are collapsed upon impact, penetration of the collapsed core member 12 and the face plate 13 into the space 18 is regulated by the filling member 51. Thus, it is possible to reliably prevent inhibition of collapse of the impact absorbing members 11 by the collapsed core member 12 and the face plate 13. Thereby, the impact absorbing member 11 is allowed to exhibit the impact resistance characteristics more reliably.

Third Embodiment

Figure 13:
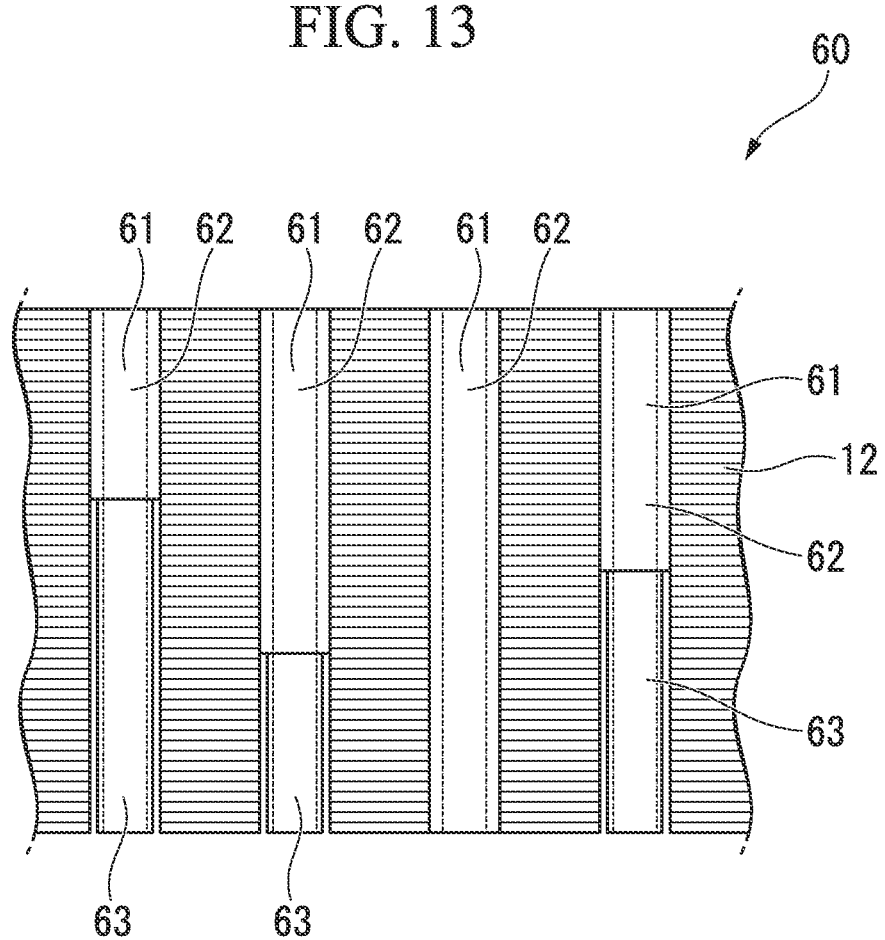
FIG. 13 is a front view which shows in detail an inner structure of an impact absorbing structure according to a third embodiment of the present invention.

Next, a description will be given for a third embodiment of the present invention. FIG. 13 shows the third embodiment of the present invention. In this embodiment, members common to those used in the previous embodiments will be given the same reference symbols, with an explanation thereof is omitted here.

As shown in FIG. 13, an impact absorbing structure 60 of this embodiment is fundamentally similar in structure to the second embodiment. However, an impact absorbing member and a filling member are formed as one piece as a molding member 61. That is, the molding member 61 is provided with a main body portion 62 functioning as the impact absorbing member and a filling portion 63 functioning as the filling member. In order for the main body portion 62 of each of the molding members 61 to function as the impact absorbing member, the main body portion 62 is formed in the same cross sectional shape as that of each of the first to the fourth impact absorbing members 11A to 11D of the second embodiment and also extended to a length which corresponds to each of them. Further, the filling portion 63 of each of the molding members 61 is lower in thickness than the main body portion 62 so as to collapse without inhibiting impact resistance absorption characteristics of the main body portion 62 upon impact.

Where, for example, the main body portion 62 is formed by laminating a plurality of carbon fiber reinforced plastics (CFRP), the above-described molding member 61 is formed by changing the number of laminated carbon fiber reinforced plastics depending on the main body portion 62 and the filling portion 63. That is, for example, while a first layer and a second layer are initially laminated all over on the main body portion 62 and the filling portion 63, a third layer and subsequent layers are laminated only on the main body portion 62. Accordingly, although the main body portion 62 is similar in inner width dimension to the filling portion 63, the main body portion 62 is greater in outer width dimension, by which the main body portion 62 is formed so as to be thicker and the filling portion 63 is formed so as to be thinner.

Then, in the above-described impact absorbing structure 60 of present embodiment, since the impact absorbing member and the filling member are formed as one piece, they can be handled integrally on assembly. That is, in the placing step of the impact absorbing members, the main body portion 62 and the filling portion 63 which constitute the impact absorbing member and the filling member may be inserted as a single member into a member inserting hole 12a. Further, during a period until completion of the connecting step of the impact absorbing members, the main body portion 62 and the filling portion 63 can be handled without having a clearance between the main body portion 62 and the filling portion 63 and more easily assembled.

In the present embodiment, since the main body portion 62 which constitutes the impact absorbing member is made different in thickness from the filling portion 63 which constitutes the filling member, the filling portion 63 is made smaller in outer width dimension than the main body portion 62, to which the present invention shall not be, however, limited. They may be made equal in outer width dimension and smaller in inner width dimension, thereby changing the thickness. In this case, the main body portion 62 and the filling portion 63 can be both placed in such a manner that no clearance is formed between the core member 12 and the combination of the main body portion 62 and the filling portion 63.

Fourth Embodiment

Figure 14:
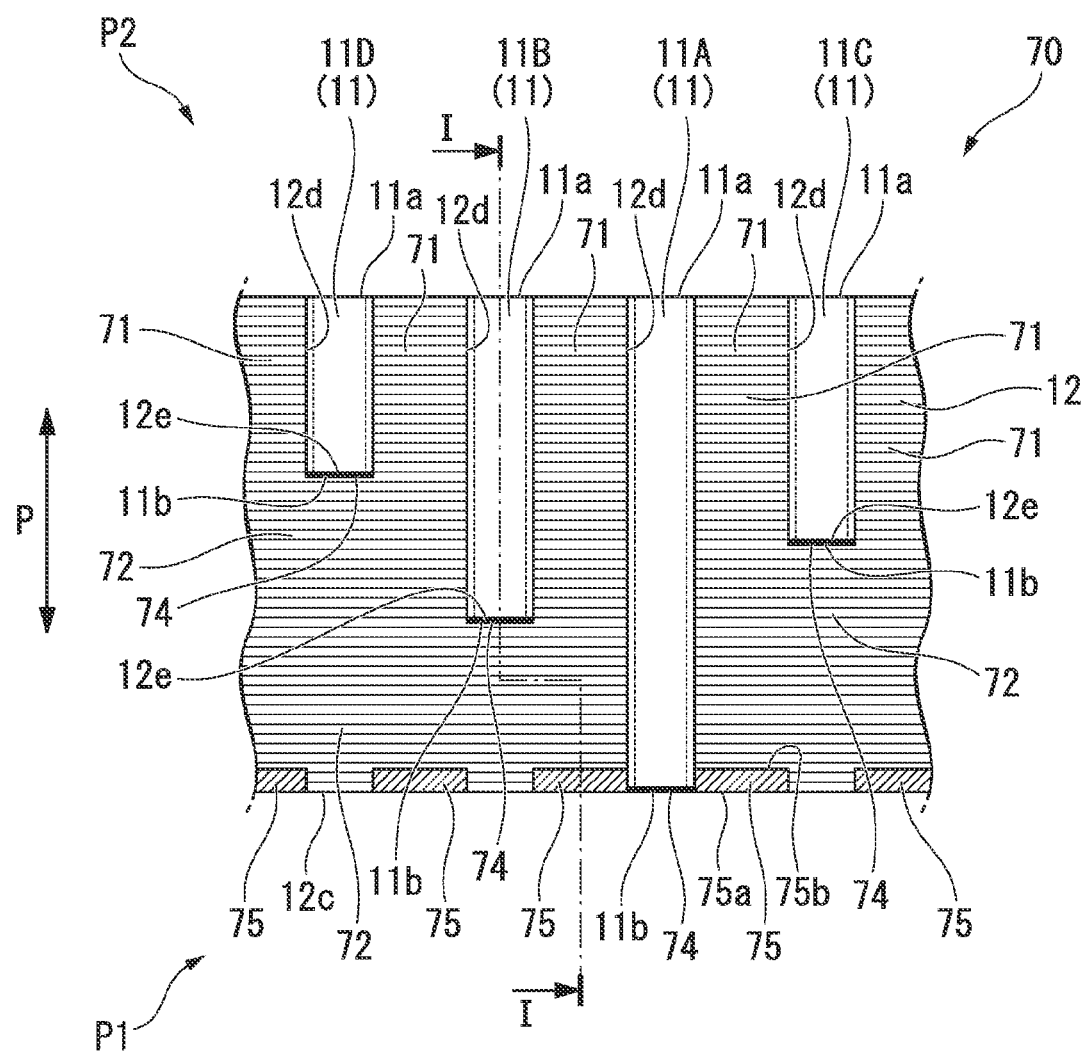
FIG. 14 is a front view which shows in detail an inner structure of an impact absorbing structure according to a fourth embodiment of the present invention.
Figure 15:
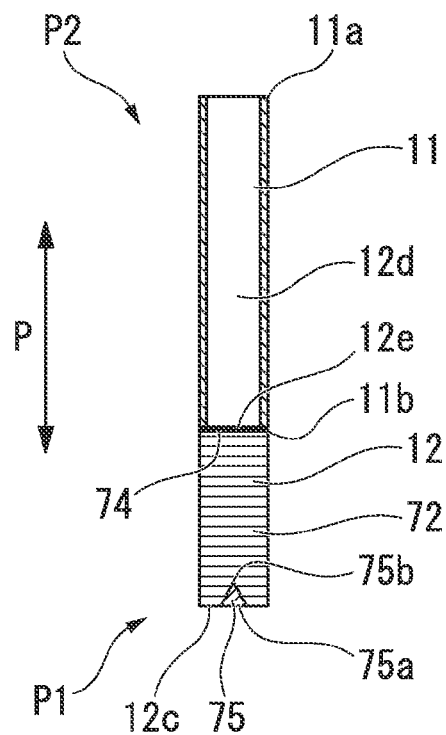
FIG. 15 is a sectional view taken along the cutting plane line I to I in FIG. 14.
Figure 16:
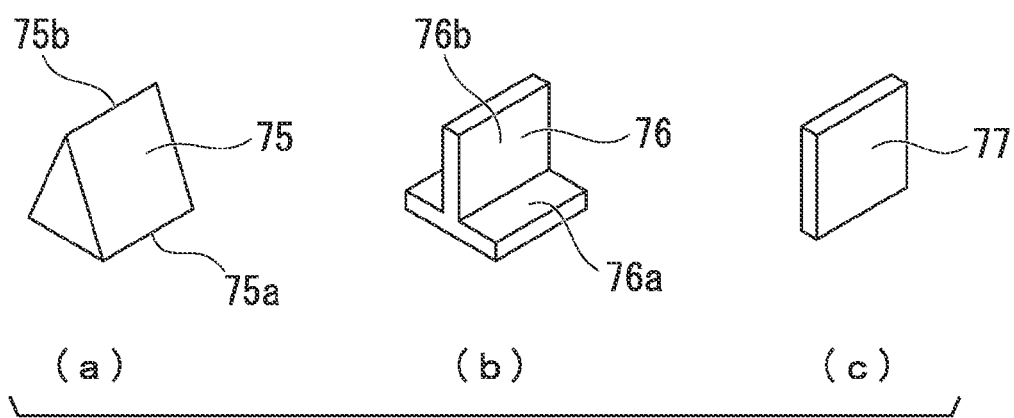
FIG. 16 is a perspective view which explains in detail collapse assisting devices of the impact absorbing structure according to the fourth embodiment of the present invention.

Next, a description will be given for a fourth embodiment of the present invention. The fourth embodiment of the present invention is shown in FIG. 14 to FIG. 16. In this embodiment, members common to those used in the previous embodiments will be given the same reference symbols, with an explanation thereof being omitted here.

As shown in FIG. 14, an impact absorbing structure 70 of the present embodiment is fundamentally similar in constitution to the second embodiment but different in that a filling member which fills a front end 11b of an impact absorbing member 11 is an extended portion of a core member 12. That is, on the core member 12, a core main body portion 71 placed between the impact absorbing members 11 is integral with a filling portion 72 placed at a region which is at the front end 11b of the impact absorbing member 11. Therefore, a member inserting hole 12d of the core member 12 into which the impact absorbing member 11 has been inserted forms a bottom 12e at a lower part which is on the side of P1 forward in the impact direction P. In addition, the impact absorbing member 11 is inserted so as to abut the bottom 12e. In this case, a film 74 that closes an opening of the film in itself is installed at the front end 11b of the impact absorbing member 11. Therefore, the front end 11b of the impact absorbing member 11 abuts a bottom 12e of the member inserting hole 12d via the film 74. Further, the impact absorbing structure 70 of the present embodiment is installed at the other edge 12c of the core main body portion 71 which is on the side of P1 forward in the impact direction P and provided with a collapse assisting device 75 which assists collapse of the core member 12 upon impact. As shown in FIG. 15 and FIG. 16(a), the collapse assisting device 75 is constituted with a wedge-shaped member and also placed in such a manner that the bottom surface 75a is in alignment with an edge surface of the other edge 12c of the core member 12 and the front end 75b cuts into the core main body portion 71 of the core member 12 upward which is on the side of P2 rearward in the impact direction P.

The impact absorbing structure 70 of the present embodiment is produced as follows. That is, in a preparation step, there is prepared the core member 12 in which the core main body portion 71 and the filling portion 72 are formed integrally by embedding the collapse assisting device 75 into the core main body portion 71. Next, the film 74 is affixed to the bottom 12e of the member inserting hole 12d on the core member 12. Then, in a placing step of the impact absorbing members, the impact absorbing member 11 is inserted into the member inserting hole 12d until the front end 11b thereof abuts the film 74, and, thereafter, in a connecting step of the impact absorbing members, one pair of face plates (not illustrated) may be affixed.

Then, according to the impact absorbing structure 70 of the present embodiment, actions and effects similar to those of the second embodiment can be obtained. Further, since the filling member is an extended portion of the core member 12, upon impact, the core member 12 will collapse, as with the core main body portion 71 between the impact absorbing members 11, thus making it possible to regulate penetration of the collapsed core main body portion 71 and the pair of face plates (not illustrated) into the front end 11b of the impact absorbing member 11. Still further, since an opening of the front end 11b of the impact absorbing member 11 is closed by the film 74, it is possible to prevent inhibition of collapse of the impact absorbing member 11 by penetration of the core member 12 and the pair of face plates (not illustrated) thereinto upon impact. Still further, a wedge shaped member constituting the collapse assisting device 75 further cuts into the core member 12 upon impact, thus resulting in concentration of stress at the front end 11b, thereby facilitating collapse of the core member 12. It is, therefore, possible to reliably prevent the core member 12 from inhibiting the progress of collapse.

In the present embodiment, the wedge shaped member is used as the collapse assisting device 75, to which the present invention shall not be, however, limited. The collapse assisting device 75 may be available in various shapes as long as it is able to assist collapse of the core member 12 upon impact. For example, as shown in FIG. 16(b), as the collapse assisting device 76, there may be available a member formed in a T-letter shape by using a base plate 76a and a projection plate 76b projecting from the base plate 76a. Then, the base plate 76a is made in alignment with an edge surface of the other edge 12c of the core member 12, and the projection portion 76b is placed so as to cut into the core member 12 toward an upper part which is on the side of P2 rearward in the impact direction P. Thereby, concentration of stress takes place at the front end of the projection portion 76b upon impact, thus making it possible to facilitate collapse of the core member 12. Further, as similarly shown in FIG. 16(c), even where the collapse assisting device 77 is constituted with a mere plate member, the plate member is embedded into the core member 12 so as to be in parallel with the impact direction P. Thereby, concentration of stress takes place at an edge, thus making it possible to facilitate the collapse upon impact. Still further, as a matter of course, the collapse assisting device of the present embodiment is applicable to each of the constitutions described in the first to the third embodiments.

A description has been so far given in detail for the embodiments of the present invention by referring to the drawings. However, specific constitutions shall not be limited to these embodiments, and the present invention includes changes in design and others within a scope not departing from the gist of the present invention.

In each of the above-described embodiments, the impact absorbing structure is assembled into the floor structure of the helicopter 1, to which the present invention shall not be, however, limited. Similar effects can be obtained in various types of movable bodies such as an aircraft and an automobile by placing the impact absorbing structure in a direction at which an impact can occur. Further, similar effects can be expected by using the impact absorbing structure not only in a moving object such as a movable body but also in a stationary body as long as it can be subjected to an impact. The present invention is applicable to various types of structural bodies including movable bodies and stationary bodies.

The invention claimed is:

1. An impact absorbing structure for absorbing an impact in a case where the impact absorbing structure is subjected to the impact in a predetermined impact direction, comprising:
   a pair of face plates; and
   a plurality of impact absorbing members interposed between the face plates, each of the impact absorbing members being constituted by a tubular-shaped body whose longitudinal central axis is arranged along the impact direction and is capable of absorbing the impact by being compressively collapsed when receiving the impact from the impact direction;
   wherein a core member is disposed between each adjacent pair of the impact absorbing members, is interposed between the face plates, and has a honeycomb structure; and
   wherein one of the impact absorbing members is arranged such that a front end of said one impact absorbing member with respect to the impact direction is placed at a different position than front ends of the other impact absorbing members with respect to the impact direction, such that the front end of said one impact absorbing member is further forward with respect to the impact direction than the front ends of the other impact absorbing members.

2. The impact absorbing structure according to claim 1, wherein the plurality of impact absorbing members have different lengths in a longitudinal direction of the impact absorbing members; and
   base ends of the impact absorbing members are placed at a same position with respect to the impact direction, the base ends being disposed rearwardly of the front ends with respect to the impact direction and further away from a location at which the impact is received.

3. A movable body, comprising:
   the impact absorbing structure according to claim 2;
   an outer structural member which is installed on the impact absorbing structure at a forward side thereof with respect to the impact direction, wherein the outer structural member is connected to the impact absorbing structure; and
   an inner structural member which is installed on the impact absorbing structure at a rearward side thereof with respect to the impact direction, wherein the inner structural member is connected to the impact absorbing structure.

4. The impact absorbing structure according to claim 1, further comprising:
   at least one filling member respectively placed on a front end side of at least one of the impact absorbing members and between the pair of face plates.

5. The impact absorbing structure according to claim 4, wherein the at least one filling member is an extended portion of at least one of the core members, respectively.

6. A movable body, comprising:
   the impact absorbing structure according to claim 5;
   an outer structural member which is installed on the impact absorbing structure at a forward side thereof with respect to the impact direction, wherein the outer structural member is connected to the impact absorbing structure; and
   an inner structural member which is installed on the impact absorbing structure at a rearward side thereof with respect to the impact direction, wherein the inner structural member is connected to the impact absorbing structure.

7. The impact absorbing structure according to claim 4, wherein the at least one impact absorbing member and the at least one filling member are respectively formed together as one piece.

8. A movable body, comprising:
   the impact absorbing structure according to claim 7;
   an outer structural member which is installed on the impact absorbing structure at a forward side thereof with respect to the impact direction, wherein the outer structural member is connected to the impact absorbing structure; and
   an inner structural member which is installed on the impact absorbing structure at a rearward side thereof with respect to the impact direction, wherein the inner structural member is connected to the impact absorbing structure.

9. A movable body, comprising:
   the impact absorbing structure according to claim 4;
   an outer structural member which is installed on the impact absorbing structure at a forward side thereof with respect to the impact direction, wherein the outer structural member is connected to the impact absorbing structure; and
   an inner structural member which is installed on the impact absorbing structure at a rearward side thereof with respect to the impact direction, wherein the inner structural member is connected to the impact absorbing structure.

10. The impact absorbing structure according to claim 1, further comprising:
    a film that closes an opening at a tip of each of the impact absorbing members.

11. A movable body, comprising:
    the impact absorbing structure according to claim 10;
    an outer structural member which is installed on the impact absorbing structure at a forward side thereof with respect to the impact direction, wherein the outer structural member is connected to the impact absorbing structure; and
    an inner structural member which is installed on the impact absorbing structure at a rearward side thereof with respect to the impact direction, wherein the inner structural member is connected to the impact absorbing structure.

12. The impact absorbing structure according to claim 1, further comprising:
    a collapse assisting device that assists collapsing of the core member, the collapse assisting device being placed on the core member on a front end thereof with respect to the impact direction.

13. A movable body, comprising:
the impact absorbing structure according to claim 12;
an outer structural member which is installed on the impact absorbing structure at a forward side thereof with respect to the impact direction, wherein the outer structural member is connected to the impact absorbing structure; and
an inner structural member which is installed on the impact absorbing structure at a rearward side thereof with respect to the impact direction, wherein the inner structural member is connected to the impact absorbing structure.

14. A movable body, comprising:
the impact absorbing structure according to claim 1;
an outer structural member which is installed on the impact absorbing structure at a forward side thereof with respect to the impact direction, wherein the outer structural member is connected to the impact absorbing structure; and
an inner structural member which is installed on the impact absorbing structure at the rearward side thereof with respect to the impact direction, wherein the inner structural member is connected to the impact absorbing structure.

15. The impact absorbing structure according to claim 1, wherein
the impact absorbing members are made of a composite material composed of a resin and a reinforced fiber.

16. The impact absorbing structure according to claim 1, wherein
the face plates fixedly hold the core members and the impact absorbing members therebetween in a direction perpendicular to the impact direction.

17. The impact absorbing structure according to claim 1, wherein
the impact absorbing members are provided in a row at predetermined intervals.

* * * * *